(12) United States Patent
Kumar et al.

(10) Patent No.: US 7,406,320 B1
(45) Date of Patent: Jul. 29, 2008

(54) METHOD AND SYSTEM FOR LOCATION ESTIMATION IN WIRELESS NETWORKS

(75) Inventors: Manikant Kumar, Pune (IN); Pravin Bhagwat, Kendall Park, NJ (US)

(73) Assignee: AirTight Networks, Inc., Mountain View, CA (US)

(*) Notice: Subject to any disclaimer, the term of this patent is extended or adjusted under 35 U.S.C. 154(b) by 151 days.

(21) Appl. No.: 10/968,461

(22) Filed: Oct. 18, 2004

Related U.S. Application Data

(60) Provisional application No. 60/569,024, filed on May 7, 2004, provisional application No. 60/527,698, filed on Dec. 8, 2003.

(51) Int. Cl.
*H04Q 7/20* (2006.01)
*G08B 13/14* (2006.01)
*G08B 23/00* (2006.01)
*G06F 11/00* (2006.01)
*G06F 12/14* (2006.01)
*G06F 12/16* (2006.01)
*G06F 15/18* (2006.01)
*G01S 3/02* (2006.01)

(52) U.S. Cl. .......... 455/456.1; 340/572.4; 726/25; 342/463; 342/465; 342/453

(58) Field of Classification Search .......... 455/456.1; 342/463, 465, 453; 340/572.4; 726/25; 702/150
See application file for complete search history.

(56) References Cited

U.S. PATENT DOCUMENTS 6,269,246 B1    7/2001  Rao et al.
6,353,406 B1    3/2002  Lanzl
6,389,294 B1 *  5/2002  Sipila .................. 455/506

(Continued)

FOREIGN PATENT DOCUMENTS

| GB | 2389483 A | 12/2003 |
| WO | 2004019559 A3 | 3/2004 |
| WO | 2004059912 A1 | 7/2004 |
| WO | 2004095192 A2 | 11/2004 |

OTHER PUBLICATIONS

Bahl et al., Radar: An In-Building RF-based User Location and Tracking System, IEEE Infocom 2000, vol. 2, pp. 775-784, Mar. 2000.

(Continued)

*Primary Examiner*—George Eng
*Assistant Examiner*—Wesley L Kim
(74) *Attorney, Agent, or Firm*—AirTight Networks; Hemant M. Chaskar

(57) ABSTRACT

A system and method for locating a wireless device in one or more wireless networks within a selected geographic region. The method includes generating a computer model of a selected geographic region including a layout and inputting information associated with one or more components of a wireless network into the computer model. The one or more components includes at least one or more sniffer devices. Additionally, the method includes determining signal intensity characteristics of the one or more components of the wireless network over at least a portion of the selected geographic region and receiving one or more wireless signals from one or more wireless devices. Moreover, the method includes determining a plurality of probabilities associated with a plurality of locations for at least one of the one or more wireless devices.

19 Claims, 9 Drawing Sheets

U.S. PATENT DOCUMENTS

| | | | |
|---|---|---|---|
| 6,393,294 | B1 | 5/2002 | Perez-Breva et al. |
| 6,414,634 | B1 | 7/2002 | Tekinay |
| 6,664,925 | B1 | 12/2003 | Moore et al. |
| 6,674,403 | B2 * | 1/2004 | Gray et al. .................. 342/463 |
| 6,754,488 | B1 | 6/2004 | Won et al. |
| 6,782,265 | B2 | 8/2004 | Perez-Breva et al. |
| 6,799,047 | B1 | 9/2004 | Bahl et al. |
| 6,839,560 | B1 | 1/2005 | Bahl et al. |
| 6,897,776 | B1 | 5/2005 | Haycraft |
| 6,990,428 | B1 * | 1/2006 | Kaiser et al. ................ 702/150 |
| 7,002,943 | B2 | 2/2006 | Bhagwat et al. |
| 7,086,089 | B2 | 8/2006 | Hrastar et al. |
| 2003/0135762 | A1 | 7/2003 | Macaulay |
| 2003/0137453 | A1 | 7/2003 | Hannah |
| 2003/0186679 | A1 | 10/2003 | Challener et al. |
| 2003/0217289 | A1 | 11/2003 | Ammon et al. |
| 2003/0218570 | A1 | 11/2003 | Moore |
| 2003/0232598 | A1 | 12/2003 | Aljadeff et al. |
| 2004/0023640 | A1 | 2/2004 | Ballai |
| 2004/0028017 | A1 | 2/2004 | Whitehill |
| 2004/0072577 | A1 | 4/2004 | Myllymaki |
| 2004/0078151 | A1 | 4/2004 | Aljadeff et al. |
| 2004/0152470 | A1 | 8/2004 | Spain |
| 2004/0157624 | A1 | 8/2004 | Hrastar |
| 2004/0203764 | A1 | 10/2004 | Hrastar et al. |

OTHER PUBLICATIONS

Castro et al., A Probabilistic Location Service for Wireless Network Environments, Ubiquitous Computing 2001, Sep. 2001.

Roos et al., A Probabilistic Approach to WLAN User Location Estimation, International Journal of Wireless Information Networks, 9(3), Jul. 2002.

Roos et al., A Statistical Modeling Approach to Location Estimation, IEE Transactions on Mobile Computing, vol. 1, No. 1, Mar. 2002.

Saha et al., Location Determination of a Mobile Device using IEEE 802.11 Access Point Signals, IEEE Wireless Communication and Networking Conference (WCNC), Mar. 2003.

Valenzuela, A Ray Tracing Approach to Predicting Indoor Wireless Transmission, 43rd IEEE Vehicular Technology Conference, 1993.

Youssef et al., WLAN Location Determination via Clustering and Probability Distributions, IEEE PerCom 2003, Mar. 2003.

Hatami et al., In-Building Intruder Detection for WLAN Access, Center for Wireless Information Network Studies, Worcester Polytechnic Institute (WPI), MA, USA, 2004 Position Location and Navigation Symposium, Apr. 26-29, 2004, pp. 592-597.

Ganu et al., Infrastructure-based location estimation in WLAN networks, http://citeseer.ist.psu.edu/663627.html.

Clouqueur et al., Sensor deployment strategy for detection of targets traversing a region, Mobile Networks and Applications, Aug. 2003, pp. 453-461, vol. 8, issue 4.

PR: IBM Debuts First Self-Diagnostic Wireless Security Tool on Linux, http://www.linuxtoday.com/infrastructure/2002061700826NWNT, alleged publication date: Jun. 17, 2002, accessed Oct. 25, 2007.

IBM Research, Wireless Security Auditor (WSA), http://www.research.ibm.com/gsal/wsa/, accessed Oct. 25, 2007.

IBM Research, Distributed Wireless Security Auditor, http://www.research.ibm.com/gsal/dwsa/, accessed Oct. 25, 2007.

* cited by examiner

METHOD AND SYSTEM FOR LOCATION ESTIMATION IN WIRELESS NETWORKS

CROSS-REFERENCES TO RELATED APPLICATIONS

This present application claims priority to U.S. Provisional Application No. 60/569,024 filed May 7, 2004, and U.S. Provisional Application No. 60/527,698 filed Dec. 8, 2003, commonly assigned, and each of which is hereby incorporated by reference for all purposes.

BACKGROUND OF THE INVENTION

The present invention relates generally to wireless computer networking techniques. More particularly, the invention provides a method and a system for estimating physical location of wireless transmitters in wireless networks according to a specific embodiment. Merely by way of example, the invention has been applied to a computer networking environment based upon the IEEE 802.11 family of standards, commonly called "WiFi." But it would be recognized that the invention has a much broader range of applicability. For example, the invention can be applied to Ultra Wide Band ("UWB"), IEEE 802.16 commonly known as "WiMAX", cellular wireless networks such as CDMA, GSM, GPRS, and others.

Computer systems proliferated from academic and specialized science applications to day to day business, commerce, information distribution and home applications. Such systems include personal computers, which are often called "PCs" for short, to large mainframe and server class computers. Powerful mainframe and server class computers run specialized applications for banks, small and large companies, e-commerce vendors and governments. Smaller personal computers can be found in many if not all offices, homes, and even local coffee shops. These computers interconnect with each other through computer communication networks based on packet switching technology such as the Internet protocol or IP. The computer systems located within a specific local geographic area such as office, home or other indoor and outdoor premises interconnect using a Local Area Network, commonly called, LAN. Ethernet is by far the most popular networking technology for LANs. The LANs interconnect with each other using a Wide Area Network called "WAN" such as the famous Internet.

While conventional computer networks proliferated in the past, currently wireless communication technologies are increasing in popularity. That is, wireless communication technologies wirelessly connect users to the computer networks. Examples of wireless networks include, but not limited to, wireless local area networks (WLAN) and cellular networks. One desirable application of wireless networks is to provide wireless access to the LAN in the office, home, public hot-spots, and other geographical locations. As merely an example, the IEEE 802.11 family of standards, commonly called WiFi, is the common standard for such wireless application. Among WiFi, the 802.11b standard-based WiFi often operates at 2.4 GHz unlicensed radio frequency spectrum and offers wireless connectivity at speeds up to 11 Mbps. The 802.11 g compliant WiFi offers even faster connectivity at about 54 Mbps and operates at 2.4 GHz unlicensed radio frequency spectrum. The 802.11a provides speeds up to 54 Mbps operating in the 5 GHz unlicensed radio frequency spectrum. The WiFi enables a quick and effective way of providing wireless extension to the existing LAN.

In order to provide wireless extension of the LAN using WiFi, one or more WiFi access points (APs) connect to the LAN connection ports either directly or through intermediate equipment such as WiFi switch. A user now wirelessly connects to the LAN using a device equipped with WiFi radio, commonly called wireless station that communicates with the AP. The connection is free from cable and other physical encumbrances and allows the user to "Surf the Web", check e-mail or use enterprise and e-commerce computer applications in an easy and efficient manner. Since access points have limited signal coverage, multiple access points may be required to provide signal coverage throughout a facility. Another advantage of wireless networks is that wireless stations can move throughout the signal coverage area and continue to connect to the computer network. In a typical operational wireless network, multiple wireless stations operate from different locations within the geographic area comprising the wireless network. Station locations may also change from time to time as the users carrying those devices move.

Determining physical location of a wireless station, or that of a signal transmitting device, is useful for many applications, such as dispatching and location based applications. Physical location information regarding a wireless station is also useful if said station either deliberately or unknowingly is causing harm to the wireless network in the form of security breach, intrusion, denial of service attack (DOS), and the like. Knowing the physical location of the wireless station in these scenarios enables the network administrator to track down the station and take action (e.g. remove it from the vicinity of the network) to avoid security or performance catastrophe. However, location tracking capability is often not supported by standard WiFi communication systems and hence a solution is highly desirable.

Prior solutions have attempted to provide mechanisms to determine physical location of a wireless station, with varying degrees of success. One technique known in prior art is to analyze time delays encountered by the radio frequency signals received by (e.g., as in global positioning system or GPS) or transmitted from (e.g., as in time difference of arrival or TDOA used in cellular network) the station with respect to transmitters (e.g., satellites in GPS) or receivers (e.g., base stations in cellular network) located at known reference positions. However this approach has several limitations in local area wireless networking environment. For example, the GPS is often infeasible for indoor environments (e.g., office buildings, warehouses, apartments, commercial facilities, and like) as the signal from satellites may not reach indoors. Further, in these environments, the time delay encountered by the radio frequency signal between the transmitter and the receiver is usually too small to be accurately measured. Also these techniques require specialized hardware and/or software in the wireless station which is often not available.

Another conventional technique involves triangulating the position of the wireless station with respect to at least three reference locations, based on signal strength measurement. The receive signal strengths at different wireless access points from the transmitting wireless station are measured. The station is then estimated to be located at the center of the triangle formed by three access points for which a cost function of the receive signal strengths (e.g., sum of squares of received signal strengths at three access points) is maximized. However, this technique fails to account for signal attenuation and reflections resulting from spatial layout components such as walls, doors, partitions, obstacles and like, and hence the location estimate is often inaccurate.

Yet another conventional technique involves definition of areas, sometimes called "locales", within the geographic region of interest. The signal strength signature is then created for each area representing received signal strength at one or more network access points from the device transmitting from the area. During the operation, the area in which a transmitting wireless station resides is determined by comparing with the signal strength signature for areas, the observed signal strengths from the transmitting wireless station received at the network access points. The comparison is done via pattern matching. By way of limitation, this deterministic pattern matching approaches, fails to compute and represent the uncertainties in the location of the wireless station arising out of factors such as antenna orientation of wireless station, transmit power variations, imprecise knowledge of obstacles, movement of people and obstacles (e.g. opening/closing of doors) within the area of interest, and like. Not representing the reality of environment can be a serious limitation, especially in applications directed to security. Additionally, some of these techniques require prior definition of areas which can be a cumbersome procedure requiring manual effort and guesswork. The techniques may also require extensive on-site measurements to come up with the signal strength signatures. This is tedious process requiring manual effort and needs to be repeated for every change in the environment such as changing location of access points, changing area layout, and so on.

Accordingly, there is need for techniques for accurate and realistic estimation of transmitter location in wireless networks requiring less manual effort.

BRIEF SUMMARY OF THE INVENTION

The present invention relates generally to wireless computer networking techniques. More particularly, the invention provides a method and a system for estimating physical location of wireless transmitters in wireless networks according to a specific embodiment. Merely by way of example, the invention has been applied to a computer networking environment based upon the IEEE 802.11 family of standards, commonly called "WiFi." But it would be recognized that the invention has a much broader range of applicability. For example, the invention can be applied to Ultra Wide Band ("UWB"), IEEE 802.16 commonly known as "WiMAX", cellular wireless networks such as CDMA, GSM, GPRS, and others.

According to an embodiment, a method for locating a wireless device in one or more wireless networks within a selected geographic region includes generating a computer model of a selected geographic region including a layout and inputting information associated with one or more components of a wireless network into the computer model. The one or more components including at least one or more sniffer devices. Additionally, the method includes determining signal intensity characteristics of the one or more components of the wireless network over at least a portion of the selected geographic region using the computer model, and receiving one or more wireless signals from one or more wireless devices by some or all of the one or more sniffer devices. Moreover, the method includes determining a plurality of probabilities associated with a plurality of locations in the at least a portion of the selected geographic region for at least one of the one or more wireless devices based on at least information associated with the signal intensity characteristics and the one or more wireless signals. The determining signal intensity characteristics includes determining at least one variability characteristic associated with signal intensity variability, and computing an indicator related to the signal intensity variability based on at least information associated with the variability characteristic.

According to another embodiment, a method for locating a wireless device in one or more wireless networks within a selected geographic region includes generating a computer model of a selected geographic region including a layout and inputting information associated with one or more components of a wireless network into the computer model. The one or more components including at least one or more sniffer devices. Additionally, the method includes determining signal intensity characteristics of the one or more components of the wireless network over at least a portion of the selected geographic region using the computer model, and receiving one or more wireless signals from one or more wireless devices by some or all of the one or more sniffer devices. Moreover, the method includes determining a plurality of probabilities associated with a plurality of locations in the at least a portion of the selected geographic region for at least one of the one or more wireless devices based on at least information associated with the signal intensity characteristics and the one or more wireless signals, and displaying a statistical location view on a display. The statistical location view includes the plurality of probabilities associated with the plurality of locations respectively.

According to yet another embodiment, a system for locating a wireless device in one or more wireless networks within a selected geographic region includes one or more signal detection devices configured to receive one or more wireless signals from one or more wireless devices and a processing system. The processing system is configured to generate a computer model of a selected geographic region including a layout, and receive information associated with one or more components of a wireless network into the computer model. The one or more components includes at least one or more signal detection devices. Additionally, the processing system is further configured to determine signal intensity characteristics of the one or more components of the wireless network over at least a portion of the selected geographic region using the computer model, and determine a plurality of probabilities associated with a plurality of locations in the at least a portion of the selected geographic region for at least one of the one or more wireless devices based on at least information associated with the signal intensity characteristics and the one or more wireless signals. The determine signal intensity characteristics includes determine at least one variability characteristic associated with signal intensity variability, and compute an indicator related to the signal intensity variability based on at least information associated with the variability characteristic.

According to yet another embodiment, a system for locating a wireless device in one or more wireless networks within a selected geographic region includes one or more signal detection devices configured to receive one or more wireless signals from one or more wireless devices, and a processing system. The processing system is configured to generate a computer model of a selected geographic region including a layout, and receive information associated with one or more components of a wireless network into the computer model. The one or more components includes at least one or more signal detection devices. Additionally, the processing system is further configured to determine signal intensity characteristics of the one or more components of the wireless network over at least a portion of the selected geographic region using the computer model, and determine a plurality of probabilities associated with a plurality of locations in the at least a portion of the selected geographic region for at least one of the one or more wireless devices based on at least information associated with the signal intensity characteristics and the one or more wireless signals. Moreover, the system includes a displaying device configured to display a statistical location view. The statistical location view includes the plurality of probabilities associated with the plurality of locations respectively.

In yet another specific embodiment, the present invention provides a method for locating a wireless device in one or more wireless networks within a selected geographic region. For example, the selected geographic region can comprise office floor, building, commercial facility, warehouse, home, outdoor region etc. The method includes generating a computer model of the selected geographic region including a layout. For example, the layout can be spatial layout comprising components such as walls, rooms, doors, partitions, columns and like. Associated with the layout components can be information comprising physical dimensions, locations and material types. The method includes inputting information associated with one or more components of a wireless network into the computer model. The one or more components include at least one or more sniffer devices. The input information can comprise location of the one or more sniffers within the selected region. The information can further comprise characteristics associated with the sniffer devices, such as antenna type and antenna orientation.

The method also includes determining signal intensity characteristics of the one or more components of the wireless network over at least a portion of the selected geographic region using the computer model. The signal intensity characteristics can constitute a signal strength model associated with each of the one or more sniffers. For example, the signal strength model represents receive signal strength at the sniffer from transmissions emanating form one or more locations within the selected geographic region. Preferably the signal strength model represents probability distribution of signal strength. In a specific embodiment, the determining signal intensity characteristics includes determining at least one variability characteristic associated with signal intensity variability and computing an indicator related to the signal intensity variability based on at least information associated with the variability characteristic. For example, the variability characteristic can be selected from a group consisting of transmission through an obstacle, transmission through an area associated with an activity level, reflection, and antenna variability related to the one or more wireless devices.

The method can receive one or more wireless signals from one or more wireless devices by some or all of the one or more sniffer devices. For example, the receiving can comprise determining (measuring) a signal intensity (strength) associated with the one or more received wireless signals. The method includes determining a plurality of probabilities associated with a plurality of locations in the at least a portion of the selected geographic region for at least one of the one or more wireless devices. The determining is based on at least information associated with the signal intensity characteristics and the one or more wireless signals.

In yet another alternative embodiment, the method can also includes displaying a statistical location view on a display, the statistical location view including the plurality of probabilities associated with the plurality of locations respectively.

In yet another specific embodiment, the invention provides computer based system for locating a wireless device in one or more wireless networks within a selected geographic region. The system can comprise one or more signal detection devices (i.e. sniffers) configured to receive one or more wireless signals from one or more wireless devices. The system can also comprise a processing system. The one or more sniffers can be coupled to the processing system over one or more computer networks.

The processing system can be configured to generate a computer model of a selected local geographic region including a layout. The system can be configured to receive information associated with one or more components of a wireless network into the computer model, and to determine signal intensity characteristics of the one or more components of the wireless network over at least a portion of the selected geographic region using the computer model. The one or more components can include one or more signal detection devices. The processing system can also be configured to determine a plurality of probabilities associated with a plurality of locations in the at least a portion of the selected geographic region for at least one of the one or more wireless devices based on at least information associated with the signal intensity characteristics and the one or more wireless signals.

In one embodiment, the system can include a displaying device configured to display a statistical location view, the statistical location view including the plurality of probabilities associated with the plurality of locations respectively.

Certain advantages and/or benefits may be achieved using the present invention. For example, the technique of the invention does not require any specialized or costly hardware/software on wireless stations to enable their location determination. Additionally, it can account for signal attenuation and reflection resulting from obstacles such as walls, furniture, obstacles and like, and hence the location estimate turns out to be more accurate. The technique of invention does not require any prior definition of areas for the sake of creating signatures. Additionally, the technique is able to compute and represent the uncertainty inherent in the location estimate of the wireless station. The technique of invention does not necessarily require on-site measurements and site surveys to build the signal model.

Depending upon the embodiment, one or more of these benefits may be achieved. These and other benefits will be described in more throughout the present specification and more particularly below.

Various additional objects, features and advantages of the present invention can be more fully appreciated with reference to the detailed description and accompanying drawings that follow.

DETAILED DESCRIPTION OF THE INVENTION

The present invention relates generally to wireless computer networking techniques. More particularly, the invention provides a method and a system for estimating physical location of wireless transmitters in wireless networks according to a specific embodiment. Merely by way of example, the invention has been applied to a computer networking environment based upon the IEEE 802.11 family of standards, commonly called "WiFi." But it would be recognized that the invention has a much broader range of applicability. For example, the invention can be applied to Ultra Wide Band ("UWB"), IEEE 802.16 commonly known as "WiMAX", cellular wireless networks such as CDMA, GSM, GPRS, and others.

The following description refers to a number of system diagrams and processes. These diagrams are merely illustrations, which should not unduly limit the scope of the claims. One of ordinary skill in the art would recognize many variations, alternatives, and modifications. Although the embodiments will be described using a selected group of systems, there can be many alternatives, modifications, and variations. For example, some of the systems may be expanded and/or combined. Other systems may be inserted to those specifically noted. Depending upon the embodiment, the specific systems may be interchanged with others replaced. Further details of these elements are found throughout the present specification.

Similarly, although some embodiments will be described using a selected sequence of processes, there can be many alternatives, modifications, and variations. For example, some of the processes may be expanded and/or combined. Other processes may be inserted to those specifically noted. Depending upon the embodiment, the specific sequence of steps may be interchanged with others replaced. Further details of these processes and steps are found throughout the present specification.

Figure 1:
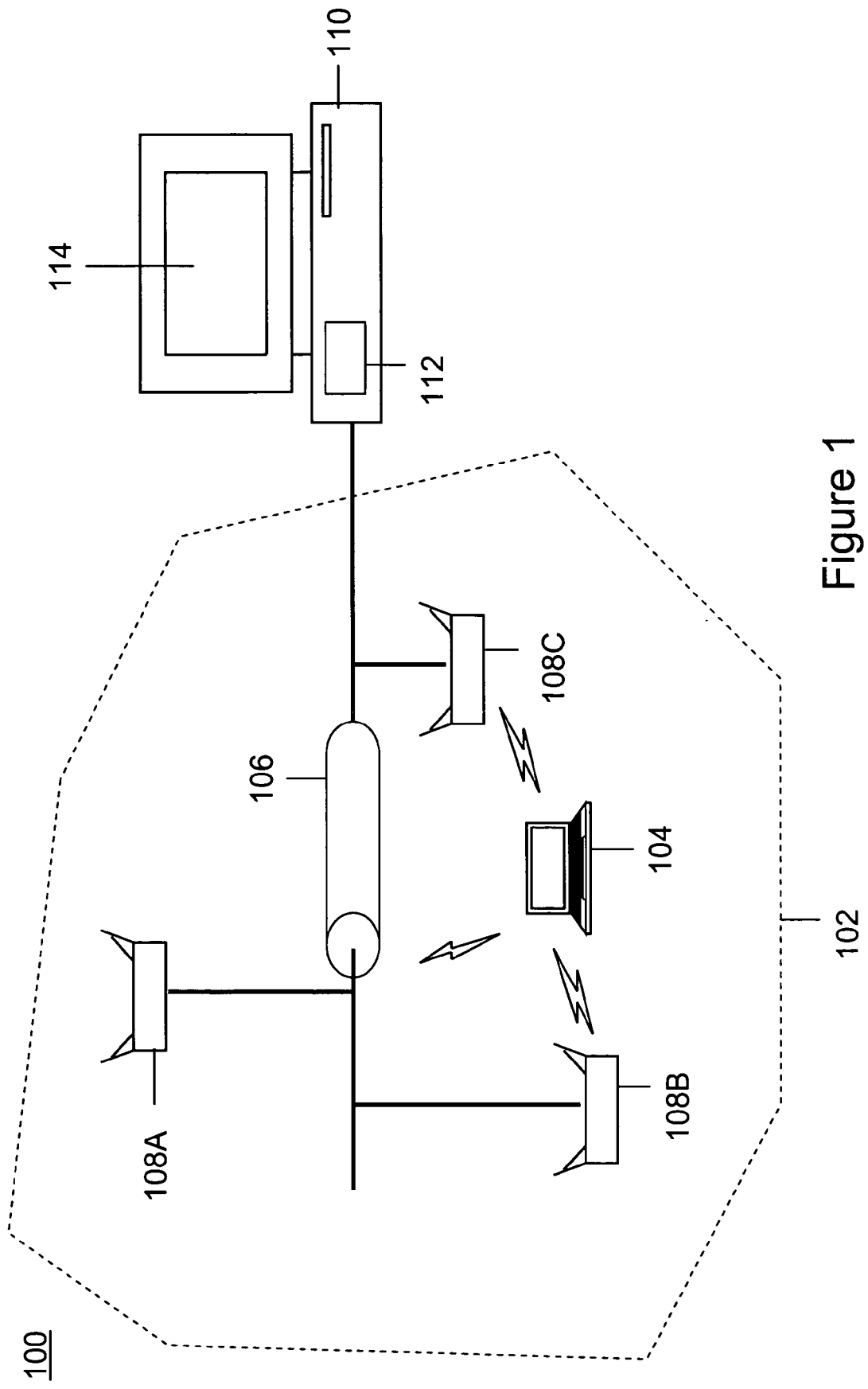
FIG. 1 illustrates a system that can facilitate location estimation in wireless networks according to one embodiment of the invention.

A system 100 according to an embodiment of the present invention is shown in FIG. 1. This diagram is merely an example, which should not unduly limit the scope of the claims herein. One of ordinary skill in the art would recognize many variations, alternatives, and modifications. The selected geographic region 102 can be any indoor and/or outdoor region within which it is desirable to locate a transmitting wireless station 104. Merely as example, the selected geographic region can comprise one or more floors, buildings or premises of office, commercial facility, warehouse, apartment, hot-spot and like. Preferably the selected geographic region also comprises at least a portion of computer network 106. The computer network 106 can be any suitable network such as local area network, wide area network or any combination of these. In one specific embodiment, the computer network is a local area network based on Ethernet technology. One or more RF sensor/signal detection devices (e.g. sensor devices 108A, 108B and 108C, each generically referenced herein as a sniffer 108) are spatially disposed within or in a selected vicinity of the selected geographic region 102.

In general, sniffer 108 can listen to a radio channel and capture transmissions on that channel. In one embodiment, sniffer 108 can cycle through multiple radio channels on which wireless communication could take place. On each radio channel, sniffer 108 can wait and listen for any ongoing transmission. In one embodiment, sniffer 108 can operate on multiple radio channels simultaneously.

Whenever a transmission is detected, sniffer 108 can collect and record the relevant information about that transmission. According to a specific embodiment, the recorded information includes, but not limited to, packet type, information derived from various fields in the packet, source identity, destination identity and strength of the received signal associated with the transmission. The information such as the day or the time of the day when the transmission was detected may also be recorded. In one specific embodiment, sniffer 108 is coupled to the computer network 106 using its Ethernet network interface. In an alternative embodiment, the sniffer is coupled to the computer network 106 over wireless connection.

In one embodiment, sniffer 108 can be any suitable receiving device capable of detecting wireless activity. To provide the desired detection and recording functionality, sniffer 108 can have a processor, a flash memory where the software code for sniffer functionality resides, a RAM which serves as volatile memory during program execution, one or more 802.11a/b/g wireless network interface cards (NICs) which perform radio and wireless MAC layer functionality, one or more (i.e. for radio diversity) of dual-band (for transmission detection in both the 2.4 GHz and 5 GHz radio frequency spectrums) antennas coupled to the wireless NICs, an Ethernet NIC which performs Ethernet physical and MAC layer functions, an Ethernet jack such as RJ-45 socket coupled to the Ethernet NIC for connecting the sniffer device to wired LAN with optional power over Ethernet or POE, a serial port which can be used to flash/configure/troubleshoot the sniffer device, and a power input. One or more light emitting diodes (LEDs) can be provided on the sniffer device to covey visual indications such as, for example, device working properly, error condition, unauthorized wireless activity alert and so on.

In one embodiment, sniffer 108 can be built using a hardware platform similar to that used to build an AP, although having different functionality and software. In one embodiment, to more unobtrusively be incorporated in the selected geographic region, sniffer 108 could have a small form factor. In one embodiment, a sniffer 108 could also be provided with radio transmit interface, thereby allowing sniffer 108 to generate interference with a suspected intruder's transmission or to transmit test signals.

The sniffer conveys the information derived from the detected wireless activity to processing system 110, over one or more computer networks 106. According to a specific embodiment, the processing system comprises a software run on PC, appliance or server computer. The processing system 110 may be physically located within the selected geographic region, in vicinity of it or at a remote location. The processing system can comprise codes 112 directed to perform various functions in accordance with the method of present invention and a displaying device 114 (e.g. computer screen).

Figure 2:
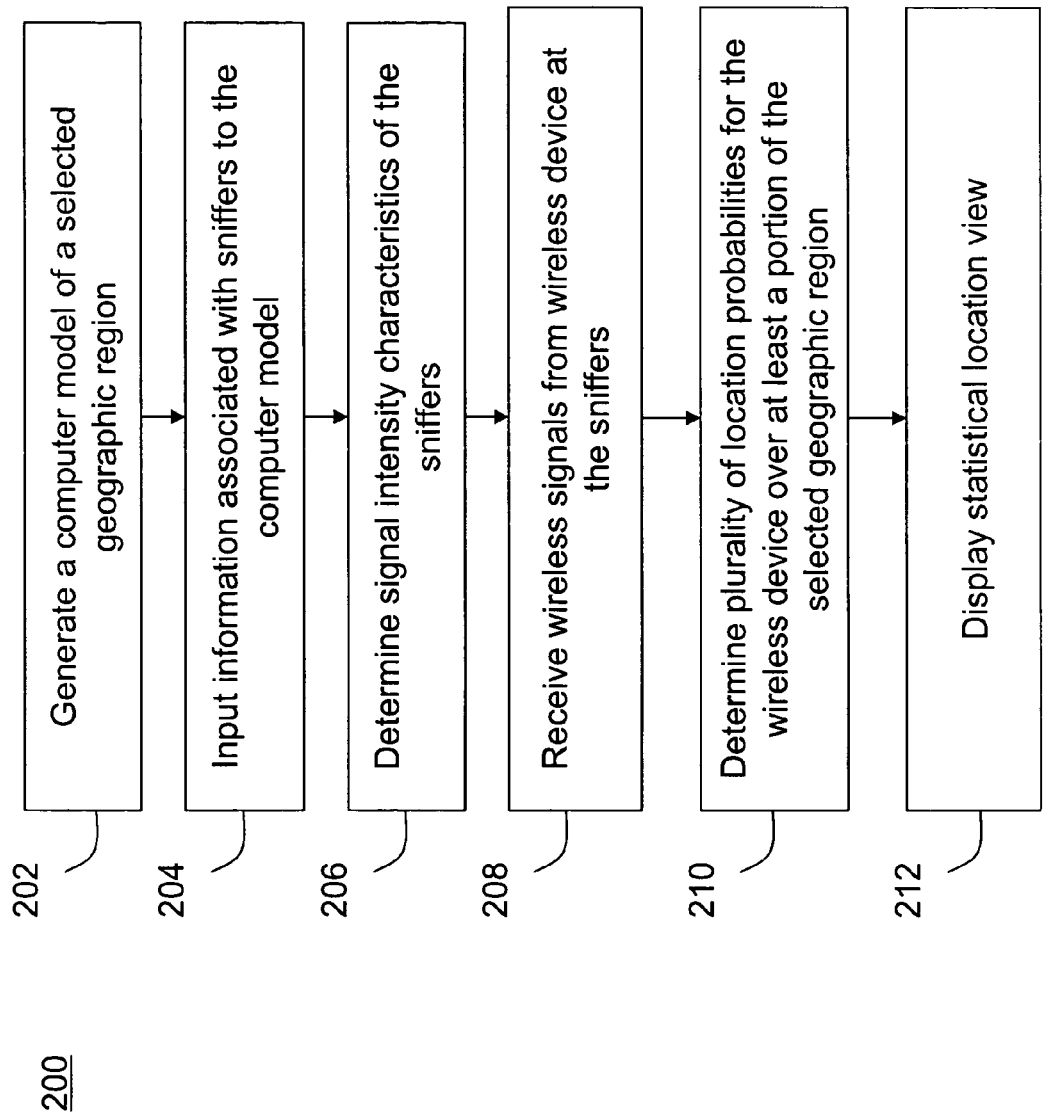
FIG. 2 illustrates a method for location estimation in wireless networks according to an embodiment of the invention.

FIG. 2 illustrates an exemplary method 200 for locating a wireless device within the selected geographic region according to an embodiment of the present invention. This diagram is merely an example, which should not unduly limit the scope of the claims herein. One of ordinary skill in the art would recognize many variations, alternatives, and modifications. The method can be implemented using sniffers 108 and processing system 110. The first step (202) can generate a computer model of the selected geographic region including a layout. For example, the layout is a spatial layout comprising layout components such as walls, rooms, columns, doors, partitions, furniture, foliage, patio and others. The computer model can include information associated with the layout components (e.g. physical dimensions, locations, material type, areas of people activity etc.). Step 204 can input information associated with one or more components of a wireless network into the computer model. Preferably, the one or more components include at least one or more sniffer devices. The inputted information includes, but not limited to, sniffer locations, antenna types and antenna orientations.

Step 206 includes determining signal intensity characteristics of the one or more components of the wireless network over at least a portion of the selected geographic region using the computer model. In a specific embodiment, a receive signal strength model at the sniffer for transmission from a selected location within the selected geographic region is generated. The determining signal intensity characteristics includes determining at least one variability characteristic associated with signal intensity variability. It further includes computing an indicator related to the signal intensity variability based on at least information associated with the variability characteristic. For example, the variability characteristic is associated with factors including, but not limited to, signal transmission through obstacle, signal reflection from obstacle, signal transmission through area of high people activity, signal antenna radiation pattern and orientation, and signal transmission through obstacle that changes state over time (e.g. door being open, semi-open or closed). In one embodiment, the indicator related to the signal intensity variability can be a signal strength (intensity) variance associated with the pass-through or reflection loss. In a specific embodiment, the signal intensity characteristics provide signal strength model for the sniffer.

At step 208, one or more wireless signals from one or more wireless devices are received by some or all of the one or more sniffer devices. In a specific embodiment, actual receive signal strength is measured for a wireless signal received at the sniffer. In an alternative specific embodiment, a function (e.g. average, moving average, exponential moving average etc.) of actual received signal strengths for one or more wireless signals at the sniffer is computed.

Step 210 includes determining a plurality of probabilities associated with a plurality of locations in the at least a portion of the selected geographic region for at least one of the one or more wireless devices based on at least information associated with the signal intensity characteristics and the one or more wireless signals. In step 212, a statistical location view is shown on a display. The statistical location view includes the plurality of probabilities associated with the plurality of locations respectively.

Figure 3A:
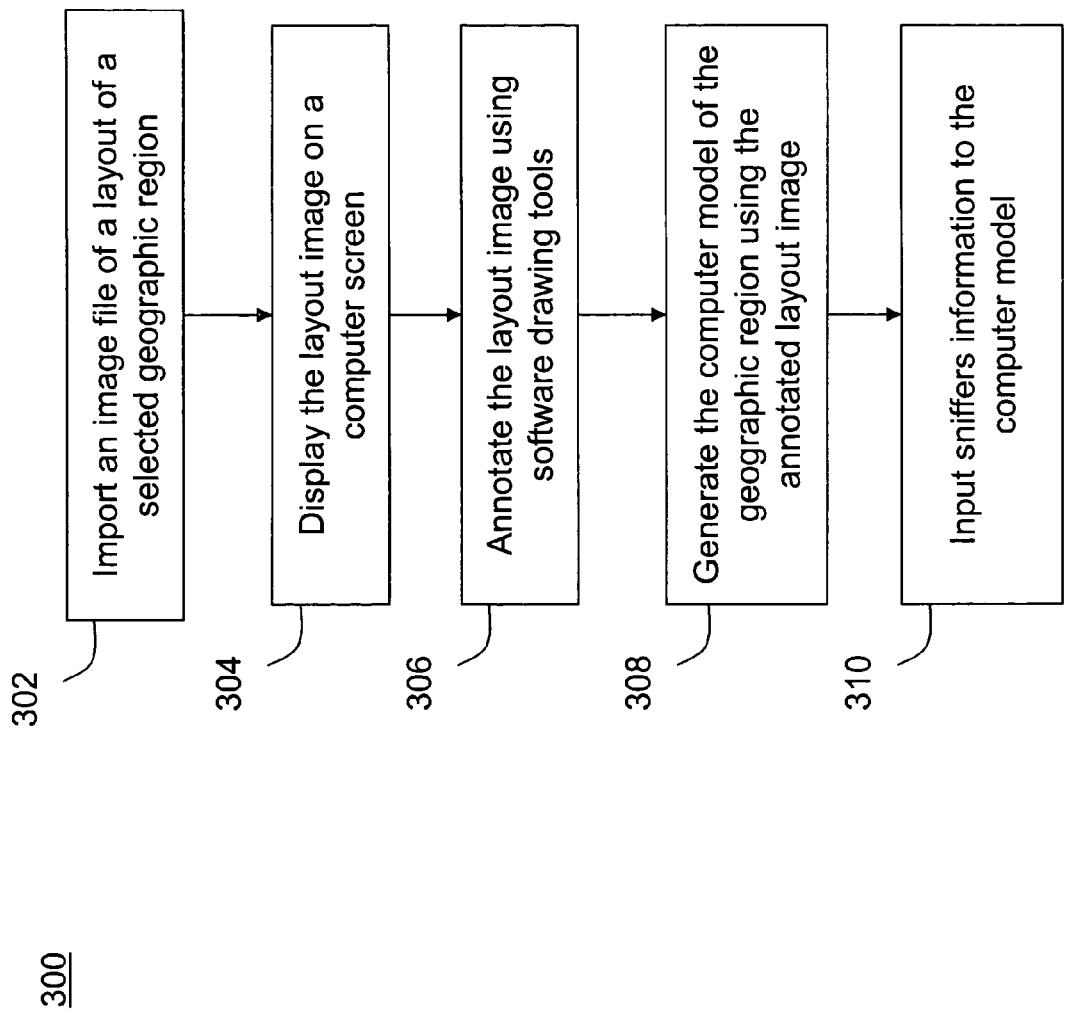
FIG. 3A illustrates an exemplary method to generate a computer model of a selected geographic region according to an embodiment of the present invention.
Figure 3B:
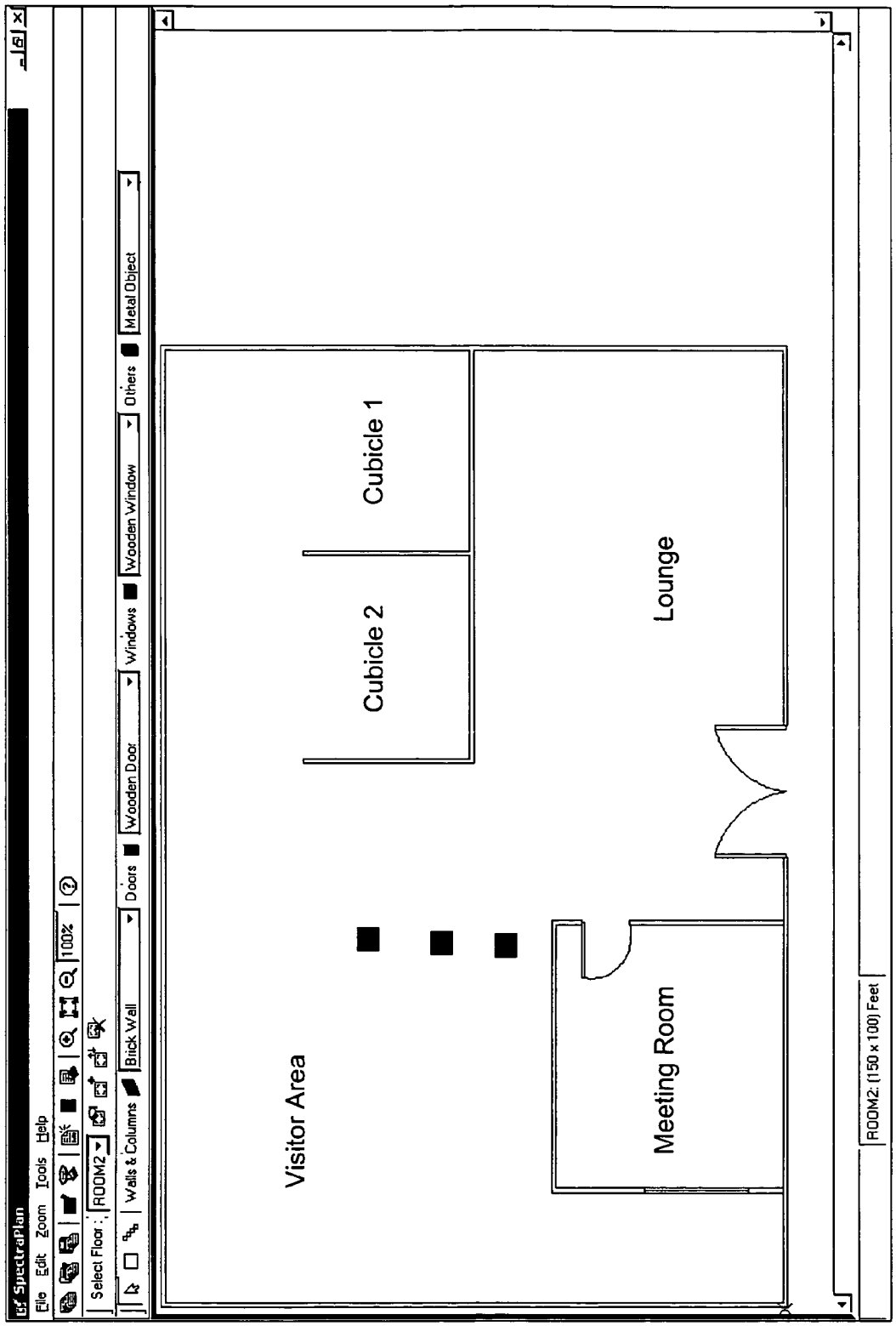
FIG. 3B illustrates an exemplary computer screen shot of a layout for a selected geographic region according to an embodiment of the present invention.

FIG. 3A illustrates an exemplary method 300 to generate a computer model of the selected geographic region and provide input to that computer model regarding sniffers according to an embodiment of the present invention. This diagram is merely an example, which should not unduly limit the scope of the claims herein. One of ordinary skill in the art would recognize many variations, alternatives, and modifications. The method 300 can be used for the steps 202 and 204. In method 300, step 302 can import an image file of a spatial layout of the selected geographic region. This image file could include a *.gif, *.jpg, or other format file. In one embodiment, the image file can depict a floor plan or a map of the selected geographic region. In another embodiment, the image file could be a photograph or a scanning of the architectural drawing of the floor plan. Step 304 can display that image file on a display device 114. For example, FIG. 3B shows an example of an image of a layout of a selected geographic region displayed on a computer screen according to an embodiment of the present invention. This diagram is merely an example, which should not unduly limit the scope of the claims herein. One of ordinary skill in the art would recognize many variations, alternatives, and modifications.

Step 306 can annotate the image. This annotation could be done using a software library of drawing tools. These drawing tools could allow a user to place objects, e.g. doors, windows, walls, entrances, obstacles, and other objects, in the floor plan. For example, in one embodiment, the drawing tools could allow a user to drag and drop (e.g. with the help of computer mouse) various objects on the image displayed on the computer screen. In one embodiment, the user can also specify dimensions (e.g. thickness, length, width, height) of the objects. In yet another embodiment, the user can also specify the materials (e.g. brick wall, sheet rock, glass, metal etc.) that the various objects are made of. In yet another embodiment, the drawing tools can also indicate unknown dimensions and/or unknown materials for objects in the layout (i.e. unavailable layout information). In one embodiment, the drawing tools can also specify one or more regions in the defined geographic region that can be ignored while running computer simulations. In another embodiment, the drawing tools can specify regions of activity (e.g. people movement).

Figure 3C:
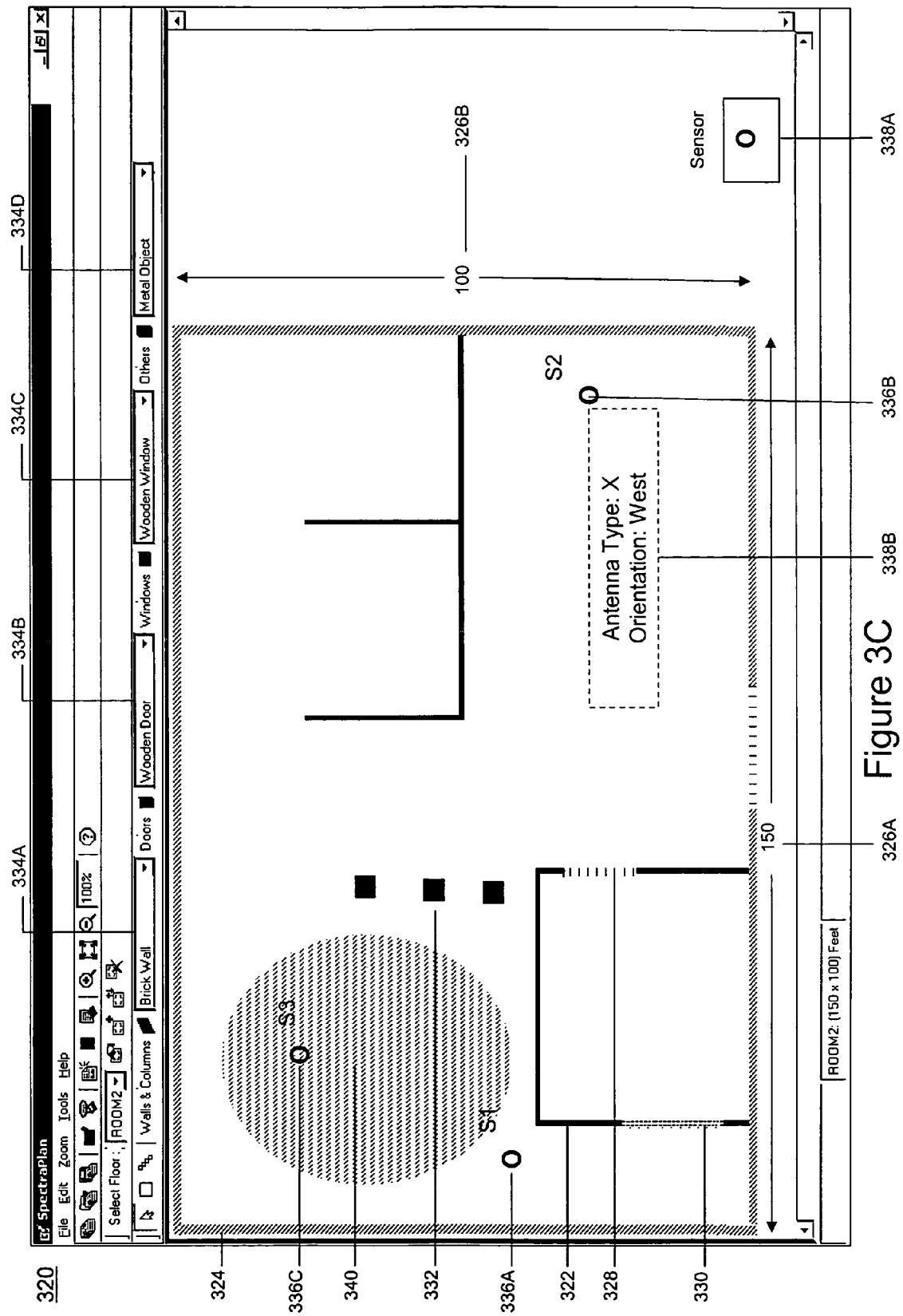
FIG. 3C illustrates an exemplary computer screen shot of an annotated layout of the geographic region shown in FIG. 3B according to an embodiment of the present invention.

FIG. 3C shows an example of an annotated image of a layout of a selected geographic region displayed on the computer screen according to an embodiment of the present invention. This diagram is merely an example, which should not unduly limit the scope of the claims herein. One of ordinary skill in the art would recognize many variations, alternatives, and modifications. The screen shot illustrates a selected geographic, region screen for viewing and editing of a floor map. In this embodiment, different material composition can be indicated by a different line pattern. For example, walls 322 could be made of brick, walls 324 could be made of concrete, a door 328 could be made of wood, a window 330 could be made of glass, and columns 332 could be made of sheet rock. In this embodiment, dimensions of various objects in the layout (e.g. dimensions 326A and 326B of concrete walls 324) can also be indicated. Region of high people activity 340 is also indicated on the layout. In this screen, a plurality of pull down menus 334A-334D can assist the user in annotating the layout image.

In method 300, step 308 can generate the computer model of the selected geographic region based on the annotated layout image provided by step 306. Note that in an alternate embodiment, the computer model can be generated using an existing annotated layout image. For example, a layout drawing file prepared by CAD (computer aided design) software could be used.

Step 310 can input information associated with the sniffers to the computer model. This input can include the locations of the sniffers on the layout. In one embodiment, a user can input the locations to the computer model by providing x-y coordinates of the locations. In another embodiment, a user can, with the help of computer mouse or stylus, point to a specific location on the computer display of the layout where a device/sniffer is (or will be) placed. In yet another embodiment, the user, with the help of computer mouse, can drag and drop an icon corresponding to the device/sniffer on a computer display of the layout at a desired location. The input information associated with the sniffers may also include information such as antenna type and orientation. In an alternative embodiment, the sniffer locations and characteristics are programmatically generated and provided to the computer model.

For example in FIG. 3C, the sniffers (e.g. sniffers 336A, 336B and 336C) can be indicated on the layout. The screen shot illustrates a sniffer location screen 338A for positioning the set of sniffers on the floor map. For example, an indication (e.g. icon) corresponding to a sniffer can be dragged from screen 338A (e.g. using a computer mouse, arrow keys on keyboard, or a stylus) and dropped at selected location on the layout. The screen shot in FIG. 3C also illustrates sniffer information screen 338B for inputting sniffer information regarding a set of sniffers. For example, the screen 338B can be opened by clicking on the sniffer icon. The information (e.g. antenna type and orientation) about the corresponding sniffer can then be entered into the screen.

In accordance with one feature of the invention, a receive signal strength model can be created for each of the sniffers over at least a portion of the selected geographic region. In one embodiment, the receive signal strength values for the model can be computed by using a ray tracing simulation method. The ray tracing method is described in a paper by Reinaldo Valenzuela of AT&T Bell Laboratories, entitled "A ray tracing approach to predicting indoor wireless transmission", published in 43rd IEEE Vehicular Technology Conference in 1993. In this method, the strength (power) of a signal emanating from a transmitter at one location and received at another location (after the signal has suffered reflections and passed through obstructions within the layout) can be computed. Note that by reversibility characteristic of radio propagation, this value also corresponds to the signal intensity value when the transmitter and the receiver locations are interchanged.

Assume that the signal power at a reference distance 'K' along every direction from a transmitter equals 'P_K'. The signal power is measured in units of decibels known as dBm, wherein 1 dBm=10 Log (Power in Watts/1 milliWatt). If the transmitter uses directional antenna, the signal power at a reference distance 'K' along any direction from a transmitter is also a function of the direction.

An exemplary equation for the power 'P_D0' at a point 'D0' after the signal travels the distance 'd0+K' from the transmitter, and does not encounter any obstruction or reflection is given as follows:

$$P\_D0(dBm)=P\_K(dBm)-n*10\log(d0/K)$$

where n is the exponent associated with radio wave propagation loss. For example, n=2 or n=1.7.

An exemplary equation for the power 'P_D1' at a point 'D1' after the signal travels a distance 'd1+K' from the transmitter, and suffers losses due to an obstruction 'L1' is given as follows:

$$P\_D1(dBm)=P\_K(dBm)-n*10\log(d1/K)-L1(dBm)$$

An exemplary equation for the power 'P_D2' at a point 'D2' after the signal travels the distance 'd2+K' from the transmitter, and suffers losses due to obstructions 'L1' and 'L2' and loss due to reflection 'R1' is given as follows:

$$P\_D2(dBm)=P\_K(dBm)-n*10\log(d2/K)-L1(dBm)-R1(dBm)-L2(dBm)$$

Similarly, the powers at any point 'D' due to all possible signal components are computed and added to generate the overall power prediction of the signal at point 'D'.

Note that the exact quantification of variables such as 'L1', 'R2', and 'L2' is often difficult and inaccurate. Additionally, a number of times the user does not know/provide adequate information regarding, for example, the dimensions or the material properties of layout objects, that is to the level of accuracy required for radio level signal prediction.

In one embodiment, a probabilistic model (e.g. a Gaussian probability distribution) can be used to account for such uncertainties. This probabilistic model can take into account inherent uncertainties associated with the radio characteristics (e.g. reflection loss, pass-through loss etc.) of layout objects as well as uncertainties arising out of inadequate specification of layout objects. In one embodiment, each of these variables can be modeled by using a Gaussian probability distribution. The mean and variance of the probability distribution associated with pass-through loss and reflection loss due to various types and sizes of objects can be determined based on laboratory experimentation and stored in the database.

In another embodiment, the probabilistic model can take into account signal variations resulting from changes in the environment (e.g. movement of people). For example, the signal path that passes through areas of high activity (e.g. cafeteria, corridors, conference rooms) exhibits a higher variability in signal strength. In yet another embodiment, the probabilistic model can take into account signal variations resulting from changes in the state of obstacles. For example, a signal path that passes through a door area exhibits higher attenuation when the door is closed than when it is open or partially open. Other types of factors resulting in signal uncertainty or variations such as imprecise knowledge of antenna radiation pattern and/or orientation of transmitter device can also be accounted for by assigning appropriate variance to signal loss due to these factors. The total signal power at the reception point is then modeled by Gaussian probability distribution having mean and variance equal to the sum of mean and variance respectively, of signal powers from all signal paths arriving from the transmission point at the reception point.

Figure 4:
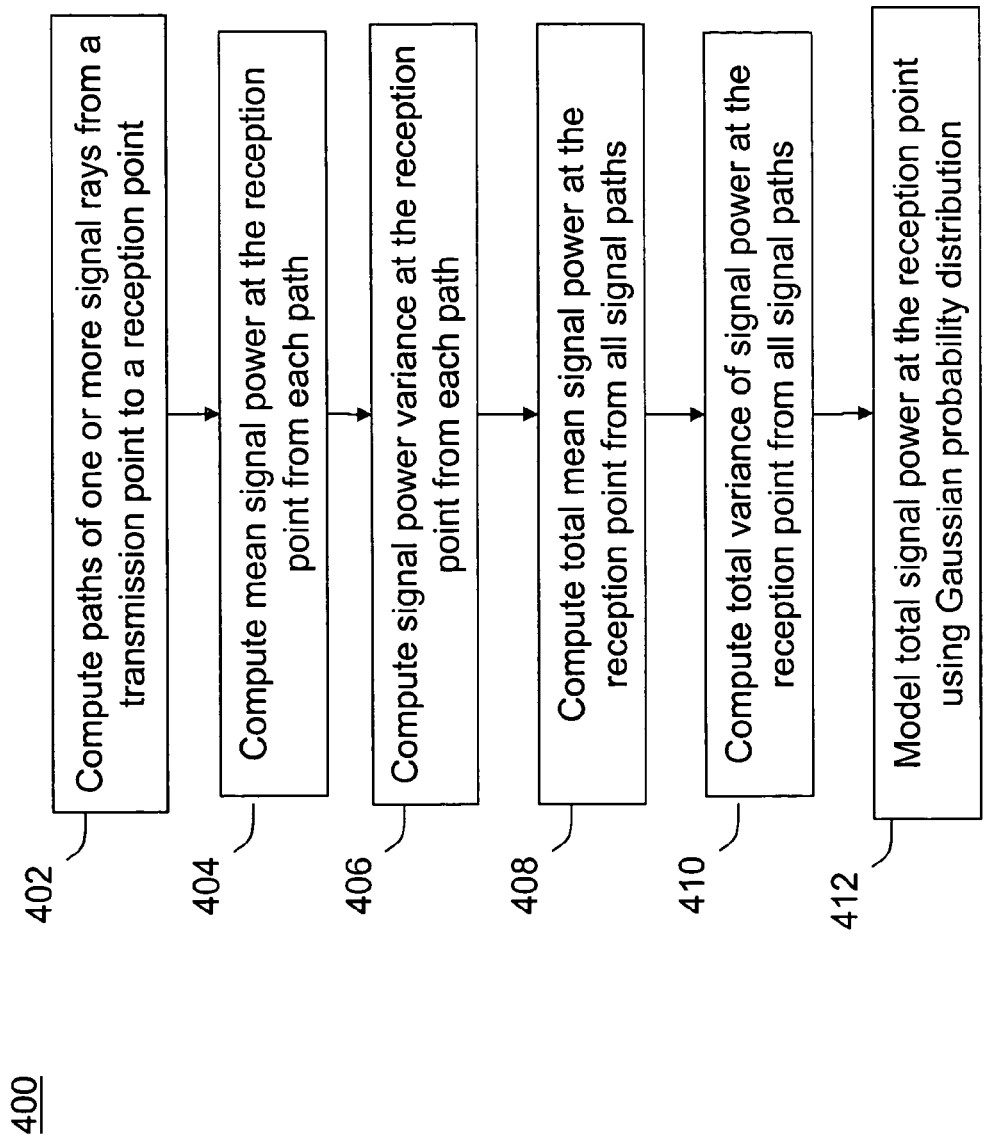
FIG. 4 illustrates an exemplary method to generate receive signal strength model for the sniffers according to an embodiment of the present invention.

FIG. 4 illustrates an exemplary method 400 to predict receive signal strength according to an embodiment of the present invention. This diagram is merely an example, which should not unduly limit the scope of the claims herein. One of ordinary skill in the art would recognize many variations, alternatives, and modifications. The method 400 can be used for the step 206. In method 400, step 402 compute the paths of signal rays from a transmission point to a reception point. In one embodiment, the paths are determined using a ray tracing technique. Both the direct path as well as paths encountering one or more reflections while traveling from the transmission point to the reception point can be computed.

Each of the signal paths may traverse (i.e. pass through) one or more obstacles in reaching the reception point. Therefore, at step 404, the mean signal power from each signal path arriving at the reception point can be computed accounting for the signal attenuation (loss) at the pass-through and reflection points. In one embodiment, the attenuation values in steps 402 and 404 can be taken from values stored in a library built using experimentation in laboratory environment.

At step 406, for each of the signal paths, a variance can be assigned to attenuation value at each pass-through and each reflection. In one embodiment, the variance can be dependent on the material characteristics of the object associated with pass-through/reflection. For example, the variance associated with pass-through/reflection attenuation at a concrete wall object is significantly greater than that associated with the glass wall object. Note that structures of steel may be embedded within the concrete wall. This embedded information is typically not known to the network administrator/end user and hence not specified in the computer model of the layout. Thus, there is larger uncertainty in predicting the pass-through attenuation through the concrete wall.

In another embodiment, the variance is dependent upon the dimension of the object associated with the pass-through. In yet another embodiment, the variance is dependent upon the level of accuracy with which the characteristics of the object are specified in the computer model of the layout. For example, the variance associated with reflection from the metal object is significantly smaller than the variance associated with reflection from the wood object. That is, metals are excellent reflectors of radio waves. Thus, reflection losses at metal object can be predicted with better accuracy and hence the smaller variance. In yet another embodiment, variance is also assigned corresponding to traversal of signal path through area of high activity (e.g. corridors, conference rooms, cafeterias, copy rooms, and restrooms). In yet a further embodiment, variance is assigned corresponding to traversal of signal path through layout component whose state changes over time (e.g. door can be open, partially open or closed).

At step 408, the mean signal power at the reception point can be computed as the sum of mean signal powers from all the signal paths from the transmission point to the reception point. At step 410, the variance of signal power at the reception point can be computed as the sum of the variances of signal powers from all the signal paths from the transmission point to the reception point. At step 412, the signal power at the reception point can be modeled by Gaussian probability distribution with computed mean and computed variance.

The receive signal strength model for each of the sniffers can be computed. The sniffers can observe (measure) the actual receive signal strength from a wireless transmitter whose location is to be estimated. Based on the receive signal strength model and the measured actual receive signal strength at one or more of the sniffers, the physical location of the transmitter can be estimated.

Figure 5A:
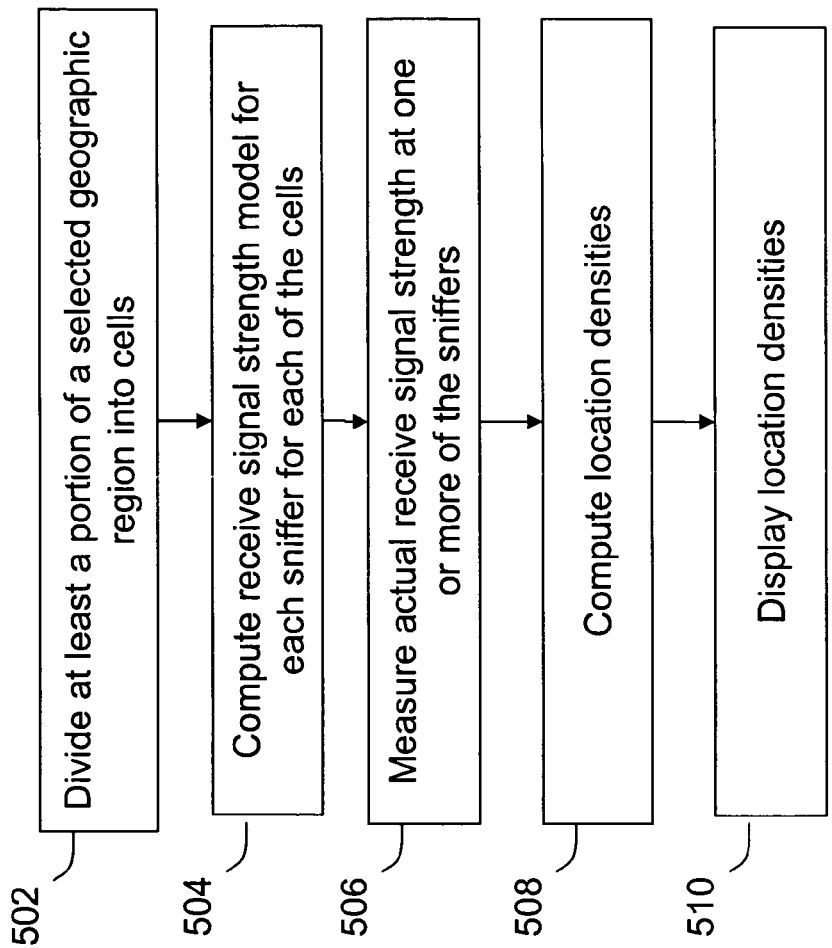
FIG. 5A illustrates an exemplary method to compute location probabilities based on the signal strength model and observed receive signal strengths according to an embodiment of the present invention.

An exemplary method 500 to determine probabilities of the wireless station being located at one or more of locations within the selected geographic region is illustrated in FIG. 5A according to an embodiment of the present invention. This diagram is merely an example, which should not unduly limit the scope of the claims herein. One of ordinary skill in the art would recognize many variations, alternatives, and modifications. The method 500 can be used for the steps 210 and 212. In step 502, at least a portion of the selected geographic region or the computer representation of it is divided into plurality of cells. Each of the cells may be rectangular, circular, hexagonal or any other appropriate shape. The cells should be as small in size as possible (e.g., 1 millimeter by 1 millimeter square shaped). Cells typically represent points rather than areas. Cells are represented in the computer representation via their co-ordinates in 2 dimensional (e.g. x-y coordinates) or three dimensional (e.g. x-y-z coordinates) space as applicable.

At step 504, the receive signal strength model is created to represent the received signal strength at each of the sniffer devices from the transmission of a given power level (e.g., 0 dBm) emanating from each of the cells. In order to account for the variability of received signal strength in practical deployments due to number of factors such as environmental conditions, imprecise knowledge of materials that various obstacles are made of, movement of people within the selected geographic region, varying signal transmission characteristics of wireless stations manufactured by different vendors, antenna radiation patterns, device orientations and so on, the signal model preferably represents the probability density function of the receive signal strength. The probability density function represents the probability of the received signal strength being within a given interval for a range of intervals. In a specific preferred embodiment, the probability density function is the Gaussian density function with the predicted mean and predicted variance. However, alternative density functions such Rayleigh density function, Log Normal density function, and others, can also be used. Notably, if the transmission power is 'p' dBm, the resultant predicted mean can be the mean computed for 0 dBm transmit power plus 'p'.

In step 506 (which is preferably executed at the time of location estimation of a selected wireless station), the receive signal strength from transmission emanating from the wireless station is measured by one or more sniffers.

In step 508, The "location density" L(x,y) defined as the probability of the received signal strength from the transmission emanating from the cell with coordinates (x,y) being within a small interval around each of the measured signal strength values at the one or more sniffers, is computed. This computation is based on the probability density function for the received signal strength calculated in the previous step. The value of transmit power level 'p' required for this computation can often be determined from the vendor information of the wireless transmitter in the wireless station. The vendor information can be derived from the first 3 bytes of the MAC address of the wireless station. The MAC address is derived from one or more packet transmissions emanating from or destined to the wireless station detected by the one or more sniffer devices.

By principle of conditional probability, the probability of the wireless station being located at cell (x,y) is then proportional to L(x,y). The values of L(x,y) or other values that are proportional to L(x,y) are then represented on the display device in relation to the layout of the selected geographic region in step 510, using plurality of colors or gradations of one or more colors. Alternatively, the various ranges of these values may be shown.

An additional step in a specific embodiment of the above method is performed when the value of 'p' cannot be determined from vendor information of the wireless transmitter, for example, due to the fact that said vendor's transmitter device allows for multiple possibilities of transmit powers. This step is based on the principle of "hypothesis testing". In this step, the values of L(x,y) are computed for all transmit power levels that are known to be transmitted by said wireless transmitter. In a specific embodiment based on "maximum likelihood estimate", the values of L(x,y) at all cells are added together for each of the power levels and the power level for which the sum is maximum is taken to be the estimate of transmit power. In one embodiment, the values of L(x,y) for this most likely transmit power are displayed. In an alternative embodiment, the value displayed at any cell is proportional to the sum total of L(x,y) at that cell over all possible transmit powers. The hypothesis testing principle can also be applied to account for factors including, but not limited to, antenna orientation of the wireless station.

Figure 5B:
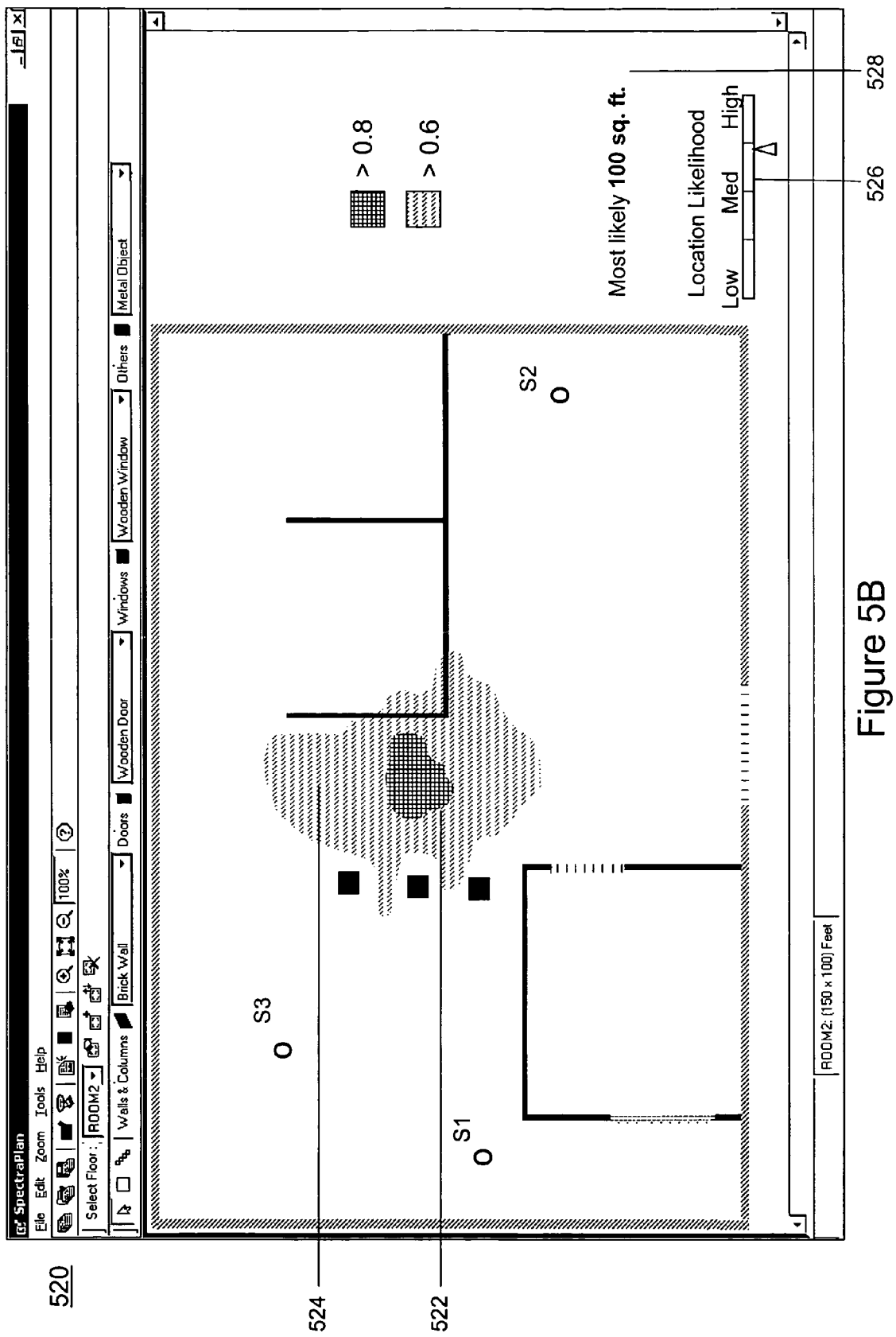
FIG. 5B illustrates an exemplary computer screen shot of location probabilities displayed in relation to the layout of the geographic region shown in FIG. 3C according to an embodiment of the present invention.

FIG. 5B shows an example of a computer screen shot 520 illustrating location probabilities in relation to the layout of the selected geographic region according to an embodiment of the present invention. This diagram is merely an example, which should not unduly limit the scope of the claims herein. One of ordinary skill in the art would recognize many variations, alternatives, and modifications. As shown merely by way of example, two regions 522 and 524 corresponding to different probability ranges (e.g., more than 0.8 and more than 0.6, respectively) are shown. Using the input screen (e.g.

slider bar) 526, the user can select the location likelihood level. In an exemplary specific embodiment, when the selected location likelihood is larger, the cells for which location density is larger are displayed. This advantageously enables zeroing in on the most likely location (e.g. by choosing larger value for the location likelihood) or see wider distribution (e.g. by choosing smaller value for the location likelihood). Using the input screen 528, the user can also specify the area of most likely locations that he or she desires to view.

Figure 5C:
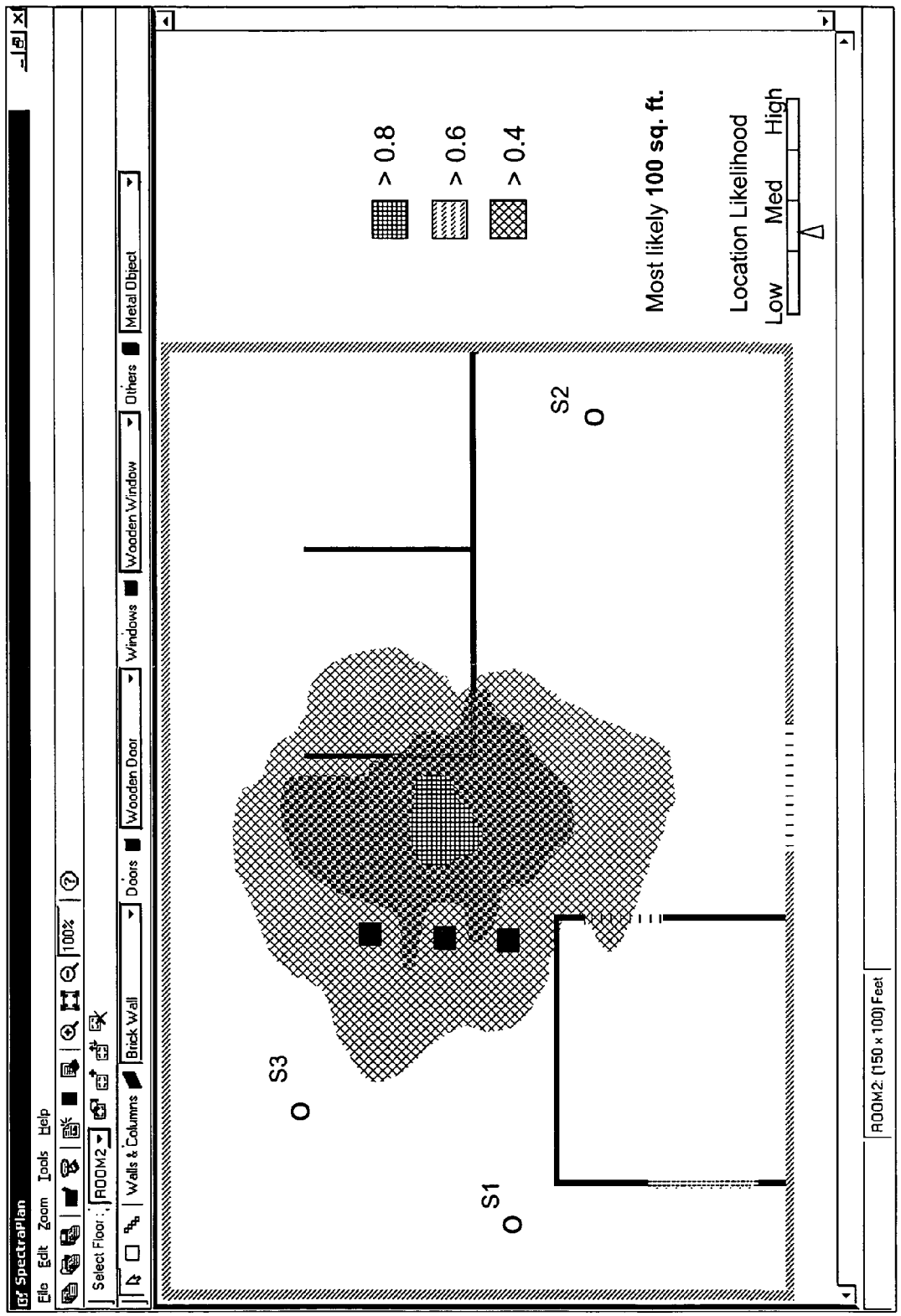
FIG. 5C illustrates another exemplary computer screen shot of location probabilities displayed in relation to the layout of the geographic region shown in FIG. 3C according to another embodiment of the present invention.

FIG. 5C shows another example of a computer screen shot 540 illustrating location probabilities in relation to the layout of the selected geographic region according to another embodiment of the present invention. This diagram is merely an example, which should not unduly limit the scope of the claims herein. One of ordinary skill in the art would recognize many variations, alternatives, and modifications. As seen, the screen shot 540 corresponds to a smaller location likelihood level, compared to screen shot 520.

The various embodiments may be implemented as part of a computer system. The computer system may include a computer, an input device, a display unit, and an interface, for example, for accessing the Internet. The computer may include a microprocessor. The microprocessor may be connected to a communication bus. The computer may also include a memory. The memory may include Random Access Memory (RAM) and Read Only Memory (ROM). The computer system may further include a storage device, which may be a hard disk drive or a removable storage drive such as a floppy disk drive, optical disk drive, and the like. The storage device can also be other similar means for loading computer programs or other instructions into the computer system.

As used herein, the term 'computer' may include any processor-based or microprocessor-based system including systems using microcontrollers, digital signal processors (DSP), reduced instruction set circuits (RISC), application specific integrated circuits (ASICs), logic circuits, and any other circuit or processor capable of executing the functions described herein. The above examples are exemplary only, and are thus not intended to limit in any way the definition and/or meaning of the term 'computer'. The computer system executes a set of instructions that are stored in one or more storage elements, in order to process input data. The storage elements may also hold data or other information as desired or needed. The storage element may be in the form of an information source or a physical memory element within the processing machine.

The set of instructions may include various commands that instruct the processing machine to perform specific operations such as the processes of the various embodiments of the invention. The set of instructions may be in the form of a software program. The software may be in various forms such as system software or application software. Further, the software may be in the form of a collection of separate programs, a program module within a larger program or a portion of a program module. The software also may include modular programming in the form of object-oriented programming. The processing of input data by the processing machine may be in response to user commands, or in response to results of previous processing, or in response to a request made by another processing machine.

As used herein, the terms 'software' and 'firmware' are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A method for locating a wireless device in one or more wireless networks within a selected geographic region, the method comprising:

generating a computer model of a selected geographic region, the computer model at least encoding a radio signal attenuation characteristic and a radio signal attenuation variability characteristic for each of a plurality of components of a layout of the selected geographic region, the each of the plurality of components being positioned within free space within the selected geographic region, the radio signal attenuation variability characteristic for the each component being indicative of projected variation for the radio signal attenuation characteristic for the each component due to at least one factor selected from the group consisting of movement of objects about the each component, operating state of the each component, and incomplete specification of physical structure of the each component;

inputting at least a spatial location information associated with one or more components of a wireless network into the computer model, the one or more components including at least one or more sniffer devices;

determining receive radio signal strength characteristics for the one or more components of the wireless network over at least a portion of the selected geographic region using the computer model, the receive radio signal strength characteristics including at least one indicator of predicted receive radio signal strength and at least one indicator of predicted variability in the receive radio signal strength at least one of the one or more components of the wireless network for each of a plurality of radio signals originating from a plurality of locations respectively within the portion of the selected geographic region, the determining including:

determining using the computer model at least a portion of a path of the each of the plurality of the originating radio signals, the portion of the path at least passing through or at least reflecting off at least one component of the layout from the plurality of components before receiving by the at least one of the one or more components of the wireless network;

computing contribution to the predicted receive radio signal strength from the at least the portion of the path based at least upon the radio signal attenuation characteristic of the at least one component of the layout; and computing contribution to the predicted variability in the receive radio signal strength from the at least the portion of the path based at least upon the radio signal attenuation variability characteristic of the at least one component of the layout;

receiving one or more radio signals at the one or more components of the wireless network from a wireless device placed at a physical location;

measuring receive radio signal strengths of the one or more radio signals received at the one or more components of the wireless network respectively;

computing probabilities of the wireless device being located at the plurality of locations within the portion of the selected geographic region using the receive radio signal strength characteristics for the one or more components of the wireless network and the measured receive radio signal strengths of the one or more radio signals received at the one or more components of the wireless network;

displaying a first estimated physical location view for the wireless device on a display in relation to the layout of the selected geographic region; and displaying a likelihood indicator associated with a first likelihood level on the display;

wherein the first estimated physical location view for the wireless device indicates one or more first estimated locations for the wireless device within the layout of the selected geographic region related to the first likelihood level, the one or more first estimated locations being from the plurality of locations.

2. The method of claim 1, and further comprising:

selecting a second likelihood level, the second likelihood level being different from the first likelihood level; and displaying a second estimated physical location view for the wireless device on the display in relation to the layout of the selected geographic region;

wherein the second estimated physical location view for the wireless device indicates one or more second estimated locations for the wireless device within the layout of the selected geographic region related to the second likelihood level, the one or more second estimated locations being from the plurality of locations.

3. The method of claim 1 wherein at least one component of the layout from the plurality of components is a portion of a free space within the selected geographic region, the portion of the free space being characterized by a level movement of persons within the portion of the free space and the radio signal attenuation variability characteristic for the at least one component being related to the level of movement of persons within the portion of the free space.

4. The method of claim 1 wherein at least one component of the layout from the plurality of components is selected from the group consisting of wall, door, elevator shaft, and column.

5. The method of claim 4 wherein a level of uncertainty of radio propagation characteristics is associated with the each component of the layout.

6. The method of claim 1 wherein the first estimated physical location view for the wireless device is represented by at least one of a plurality of graphic features.

7. The method of claim 6 wherein the at least one of a plurality of graphic features is selected from the group consisting of color, gradation of color, fill pattern, contour, boundary, and region.

8. The method of claim 1 wherein the layout comprises a floor plan including one or more walls and one or more entrances.

9. The method of claim 1 wherein the layout comprises a top view of a selected outdoor region.

10. The method of claim 1, and further comprising inputting at least a radio signal receiving characteristic information associated with the one or more components of the wireless network into the computer model.

11. The method of claim 10 wherein the radio signal receiving characteristic information comprises antenna information associated with the one or more components of the wireless network.

12. The method of claim 11 wherein the antenna information is related to at least one selected from the group consisting of antenna type and antenna orientation.

13. The method of claim 1 wherein the at least one indicator of the predicted variability in the receive radio signal strength is a probability distribution associated with the receive radio signal strength.

14. The method of claim 1, and further comprising inputting to the computer model at least one or more physical dimensions of the each component of the layout or at least one or more material types of the each component of the layout.

15. The method of claim 1 wherein the radio signal attenuation characteristic and the radio signal attenuation variability characteristic for the each component of the layout of the selected geographic region are associated with pass through attenuation.

16. The method of claim 1 wherein the radio signal attenuation characteristic and the radio signal attenuation variability characteristic for the each component of the layout of the selected geographic region are associated with reflection attenuation.

17. The method of claim 1 wherein the determining the receive radio signal strength characteristics for the at least one of the one or more components of the wireless network over the at least the portion of the selected geographic region using the computer model being free from on-site measurements of receive radio signal strengths at the at least one of the one or more components of the wireless network.

18. A computer based system for location estimation in wireless networks, the system comprising:

means for generating a computer model of a selected geographic region, the computer model at least encoding a radio signal attenuation characteristic and a radio signal attenuation variability characteristic for each of a plurality of components of a layout of the selected geographic region, the each of the plurality of components being positioned within free space within the selected geographic region, the radio signal attenuation variability characteristic for the each component being indicative of projected variation for the radio signal attenuation characteristic for the each component due to at least one factor selected from the group consisting of movement of objects about the each component, operating state of the each component, and incomplete specification of physical structure of the each component;

means for inputting at least a spatial location information associated with one or more components of a wireless network into the computer model, the one or more components including at least one or more sniffer devices;

means for determining receive radio signal strength characteristics for the one or more components of the wireless network over at least a portion of the selected geographic region using the computer model, the receive radio signal strength characteristics including at least one indicator of predicted receive radio signal strength and at least one indicator of predicted variability in the receive radio signal strength at least one of the one or more components of the wireless network for each of a plurality of radio signals originating from a plurality of locations respectively within the portion of the selected geographic region, the determining including:

determining using the computer model at least a portion of a path of the each of the plurality of the originating radio signals, the portion of the path at least passing through or at least reflecting off at least one component of the layout from the plurality of components before receiving by the at least one of the one or more components of the wireless network;

computing contribution to the predicted receive radio signal strength from the at least the portion of the path based at least upon the radio signal attenuation characteristic of the at least one component of the layout; and computing contribution to the at least one indicator of the predicted variability in the receive radio signal strength from the at least the portion of the path based at least upon the radio signal attenuation variability characteristic of the at least one component of the layout;

means for receiving one or more radio signals at the one or more components of the wireless network from a wireless device placed at a physical location;

means for measuring receive radio signal strengths of the one or more radio signals received at the one or more components of the wireless network respectively;

means for computing probabilities of the wireless device being located at the plurality of locations within the portion of the selected geographic region using the receive radio signal strength characteristics for the one or more components of the wireless network and the measured receive radio signal strengths of the one or more radio signals received at the one or more components of the wireless network;

means for displaying a first estimated physical location view for the wireless device on a display in relation to the layout of the selected geographic region; and means for displaying a likelihood indicator associated with a first likelihood level on the display;

wherein the first estimated physical location view for the wireless device indicates one or more first estimated locations for the wireless device within the layout of the selected geographic region related to the first likelihood level, the one or more first estimated locations being from the plurality of locations.

19. The system of claim 18 wherein the determining the receive radio signal strength characteristics for the at least one of the one or more components of the wireless network over the at least the portion of the selected geographic region using the computer model being free from on-site measurements of receive radio signal strengths at the at least one of the one or more components of the wireless network.

\* \* \* \* \*